United States Patent
Tsai et al.

(10) Patent No.: US 9,030,628 B2
(45) Date of Patent: May 12, 2015

(54) BACKLIGHT MODULE AND DISPLAY APPARATUS THEREOF

(71) Applicant: Wistron Corporation, New Taipei (TW)

(72) Inventors: Hsu-Chi Tsai, New Taipei (TW);
Jyun-Sheng Syu, New Taipei (TW);
Tien-Yu Yeh, New Taipei (TW);
Chih-To Hsieh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 200 days.

(21) Appl. No.: 13/656,731

(22) Filed: Oct. 21, 2012

(65) Prior Publication Data

US 2013/0342790 A1 Dec. 26, 2013

(30) Foreign Application Priority Data

Jun. 22, 2012 (TW) .............................. 101122418 A

(51) Int. Cl.
*G02F 1/1333* (2006.01)
*G02F 1/1335* (2006.01)
*F21V 8/00* (2006.01)

(52) U.S. Cl.
CPC .............. *G02B 6/0023* (2013.01); *G02B 6/009* (2013.01); *G02F 1/133615* (2013.01); *G02F 2001/133614* (2013.01)

(58) Field of Classification Search
USPC ................................................. 349/58, 61–65
See application file for complete search history.

(56) References Cited

U.S. PATENT DOCUMENTS

| | | | |
|---|---|---|---|
| 7,667,239 B2 | 2/2010 | Pang | |
| 7,950,814 B2 | 5/2011 | Chang | |
| 8,395,725 B2* | 3/2013 | Takeuchi et al. | ................. 349/62 |
| 8,807,818 B2* | 8/2014 | Hirohata et al. | ............... 362/612 |
| 8,830,151 B2* | 9/2014 | Kim et al. | ........................ 345/88 |
| 2006/0072339 A1 | 4/2006 | Li | |
| 2008/0011944 A1* | 1/2008 | Chua et al. | ............... 250/227.24 |

FOREIGN PATENT DOCUMENTS

| | | |
|---|---|---|
| TW | 200612145 | 4/2006 |
| TW | 200925735 | 6/2009 |

OTHER PUBLICATIONS

Office action mailed on Jan. 22, 2015 for the Taiwan application No. 101122418, filed Jun. 22, 2012, p. 1 line 10-14, p. 2-8 and p. 9 line 1-5.

* cited by examiner

*Primary Examiner* — Huyen Ngo
(74) *Attorney, Agent, or Firm* — Winston Hsu; Scott Margo

(57) ABSTRACT

A backlight module is used for providing white light to a liquid crystal panel. The backlight module includes a light guide plate, a backlight source, and a phosphor layer structure. The light guide plate has a light entrance surface. The backlight source is disposed on a position corresponding to the light entrance surface of the light guide plate for emitting light. The phosphor layer structure is disposed between the backlight source and the light entrance surface of the light guide plate and is away from the backlight source by a specific distance, for receiving the light emitted by the backlight source to generate the white light.

18 Claims, 5 Drawing Sheets

BACKLIGHT MODULE AND DISPLAY APPARATUS THEREOF

BACKGROUND OF THE INVENTION

1. Field of the Invention

The present invention relates to a backlight module and a display apparatus thereof, and more specifically, to a backlight module of disposing a phosphor layer structure between a light entrance surface of a light guide plate and a backlight source and away from the backlight source by a specific distance and a display apparatus thereof.

2. Description of the Prior Art

Since liquid crystal molecules do not produce light themselves, a common method for driving a liquid crystal display device to display images involves utilizing a backlight module to provide light with sufficient brightness and uniform distribution to the liquid crystal display device. Therefore, a backlight module is one of the major components of a liquid crystal display device.

A conventional light emitting design is to utilize an LED (Light Emitting Diode) device disposed on a light emitting side of a light guide plate to emit white light into the light guide plate and then generate a surface light source with sufficient brightness and uniform distribution via the light guiding design of the light guide plate.

The aforesaid LED device for generating the white light usually utilizes a design of packaging an LED for emitting light of a specific wavelength and a silica gel doped with corresponding phosphors, so as to generate the white light when the phosphors are excited by light emitted from the LED (e.g. utilizing a blue LED to excite yellow phosphors, utilizing a blue LED to excite dual-color phosphors, or utilizing an ultraviolet LED to excite red, green, and blue phosphors).

However, since heat energy generated by the LED could be directly transmitted to the phosphors in the aforesaid design, thermal degradation of the phosphors may occur after the LED device is used over a period of time, so as to influence the gray tone and color coordinate of the white light. Thus, the aforesaid design may not only reduce the image display quality of the liquid crystal panel, but also decrease the light emitting efficiency and life of the phosphors.

SUMMARY OF THE INVENTION

An objective of the present invention is to provide a backlight module of disposing a phosphor layer structure between a light entrance surface of a light guide plate and a backlight source and away from the backlight source by a specific distance and a display apparatus thereof, for solving the aforesaid problem.

The present invention provides a backlight module for providing white light to a liquid crystal panel. The backlight module includes a light guide plate, a backlight source, and a phosphor layer structure. The light guide plate has a light entrance surface. The backlight source is disposed on a position corresponding to the light entrance surface of the light guide plate for emitting light. The phosphor layer structure is disposed between the backlight source and the light entrance surface of the light guide plate and is away from the backlight source by a specific distance, for receiving the light emitted by the backlight source to generate the white light.

According to the claimed invention, the phosphor layer structure is a phosphor tape attached to the light entrance surface.

According to the claimed invention, the phosphor concentration of the phosphor tape falls within a range between 3% and 4%, so as to make a color coordinate of the white light fall within a range of (0.28±0.03, 0.29±0.03).

According to the claimed invention, the backlight source includes at least one blue LED (Light Emitting Diode), and yellow or dual-color phosphors are correspondingly doped in the phosphor tape.

According to the claimed invention, the backlight source includes at least one ultraviolet LED, and red, green, and blue phosphors are correspondingly doped in the phosphor tape.

According to the claimed invention, the phosphor concentration of the phosphor tape is between 7% and 8%, so as to make a color coordinate of the white light fall within a range of (0.313±0.03, 0.329±0.03).

According to the claimed invention, the backlight module further includes a frame. The frame is disposed at a position corresponding to the light guide plate for containing the light guide plate. The phosphor layer structure is a phosphor sheet disposed on the frame to be located between the light entrance surface of the light guide plate and the backlight source.

According to the claimed invention, the phosphor concentration of the phosphor sheet is between 3% and 4%, so as to make a color coordinate of the white light fall within a range of (0.28±0.03, 0.29±0.03).

According to the claimed invention, the phosphor concentration of the phosphor sheet is between 7% and 8%, so as to make a color coordinate of the white light fall within a range of (0 0.313±0.03, 0.329±0.03).

The present invention further provides a display apparatus. The display apparatus includes a liquid crystal panel and a backlight module. The backlight module is disposed at a side of the liquid crystal panel for providing white light to the liquid crystal panel. The backlight module includes a light guide plate, a backlight source, and a phosphor layer structure. The light guide plate has a light entrance surface. The backlight source is disposed on a position corresponding to the light entrance surface of the light guide plate for emitting light. The phosphor layer structure is disposed between the backlight source and the light entrance surface of the light guide plate and is away from the backlight source by a specific distance, for receiving the light emitted by the backlight source to generate the white light.

In summary, the present invention utilizes the design in which the phosphor layer structure is disposed between the light entrance surface of the light guide plate and the backlight source and is away from the backlight source by a specific distance, to prevent heat energy generated by the backlight source from being directly transmitted to the phosphors in the phosphor layer structure. In such a manner, the present invention could efficiently prevent thermal degradation of the phosphors, so as to solve the prior art problem in which the gray tone and color coordinate of the white light are influenced by thermal degradation of the phosphors. Thus, the present invention could not only improve the image display quality of the display apparatus and the light emitting efficiency of the phosphors, but also prolong life of the phosphors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
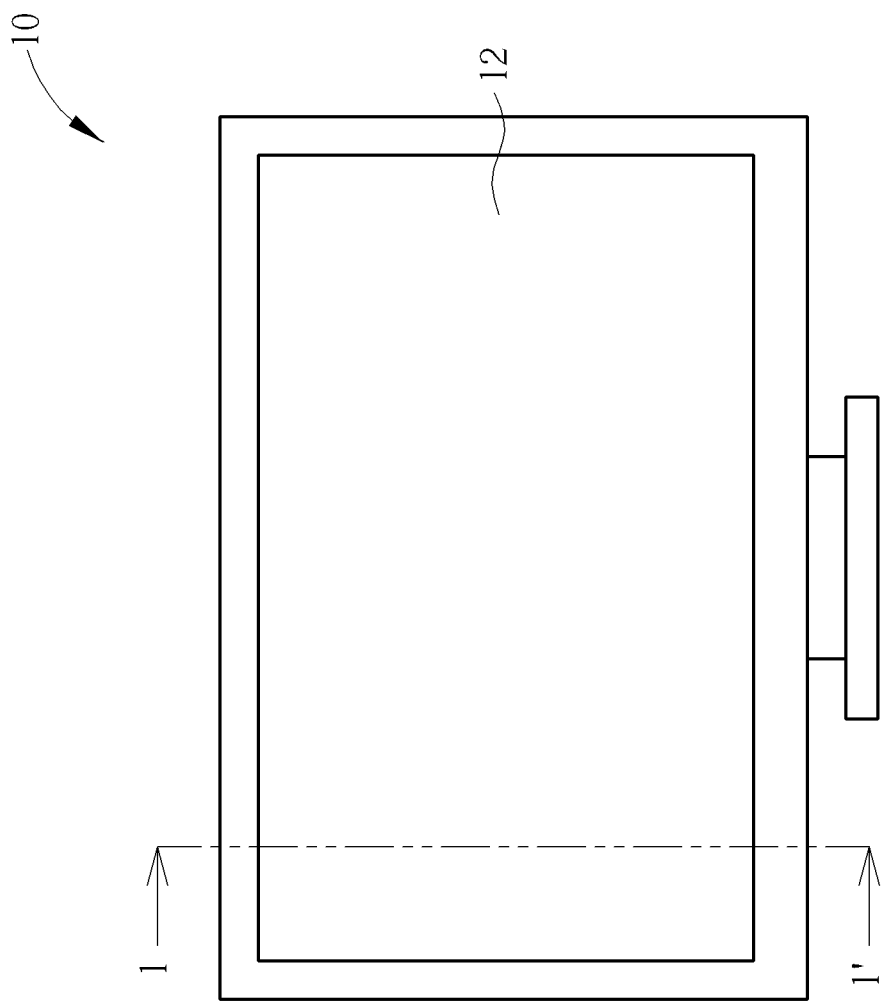
FIG. 1 is a diagram of a display apparatus according to an embodiment of the present invention.
Figure 2:
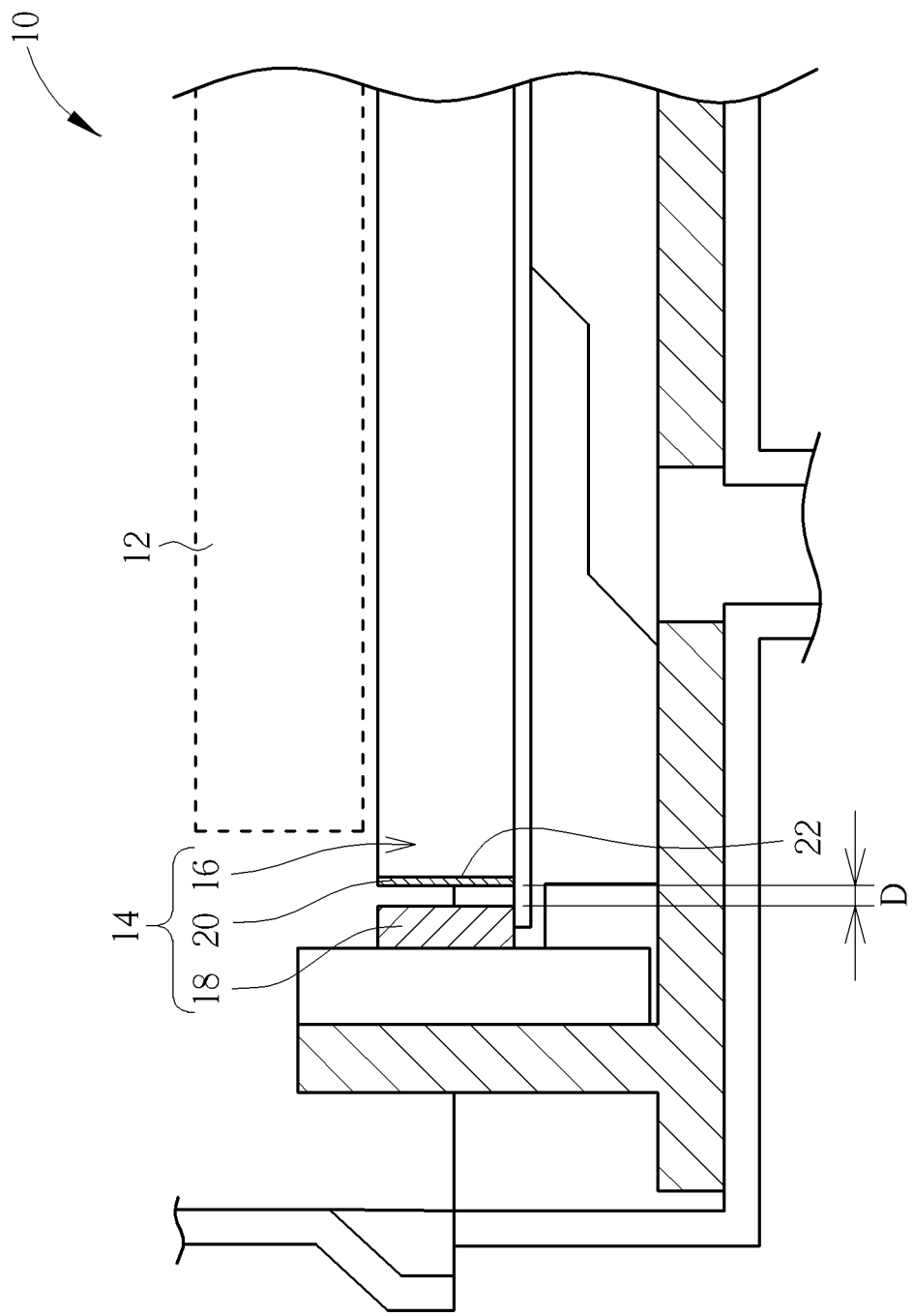
FIG. 2 is a partial sectional diagram of the display apparatus in FIG. 1 along a sectional line 1-1'.

Please refer to FIG. 1 and FIG. 2. FIG. 1 is a diagram of a display apparatus 10 according to an embodiment of the present invention. FIG. 2 is a partial sectional diagram of the display apparatus 10 in FIG. 1 along a sectional line 1-1'. In this embodiment, the display apparatus 10 could be an LCD (Liquid Crystal Display) television (as shown in FIG. 1), but not limited thereto, meaning that the display apparatus 10 could also be other display device, such as an LCD screen of a notebook. As shown in FIG. 1 and FIG. 2, the display apparatus 10 includes a liquid crystal panel 12 (briefly depicted by dotted lines in FIG. 2) and a backlight module 14. The backlight module 14 is disposed at a side of the liquid crystal panel 12 for providing white light with sufficient brightness and uniform distribution to the liquid crystal panel 12.

More detailed description for components of the backlight module 14 is provided as follows. As shown in FIG. 2, the backlight module 14 includes a light guide plate 16, a backlight source 18, and a phosphor layer structure 20. The light guide plate 16 has a light entrance surface 22. The backlight source 18 is disposed in a position of the backlight module 14 corresponding to the light entrance surface 22 of the light guide plate 16. The backlight source 18 could be a light bar composed of a plurality of light emitting diodes (but not limited thereto) for providing sufficient light to be incident into the phosphor layer structure 20. The phosphor layer structure 20 is disposed between the light entrance surface 22 of the light guide plate 16 and the backlight source 18 and is away from the backlight source 18 by a specific distance D. To be more specific, the phosphor layer structure 20 and the backlight source 18 are independently disposed in the backlight module 14 to prevent heat energy generated by the backlight source 18 from being directly transmitted to the phosphor layer structure 20. In this embodiment, the phosphor layer structure 20 could be a phosphor tape attached to the light entrance surface 22 (as shown in FIG. 2), and the color of the phosphor doped in the phosphor tape could vary with the wavelength of light (i.e. visible light or invisible light) emitted by the backlight source 18. For example, in this embodiment, the backlight source 18 could include at least one blue LED for emitting blue light, and yellow or dual-color phosphors could be correspondingly doped in the phosphor tape. In another embodiment, the backlight source 18 could include at least one ultraviolet LED, and red, green, and blue phosphors could be correspondingly doped in the phosphor tape. As for which design is utilized, it depends on the practical application of the display apparatus 10.

Via the aforesaid design, the light emitted by the backlight source 18 could be incident into the phosphor layer structure 20 first. Accordingly, the phosphors doped in the phosphor layer structure 20 could be excited by the light so as to generate the white light. Subsequently, the white light could be incident into the light guide plate 16 via the light entrance surface 22, and then emitted from the light guide plate 16 via a light guiding structure in the light guide plate 16 (e.g. a mesh dot layer formed on a bottom surface of the light guide plate 16) so as to provide a surface light source with sufficient brightness and uniform distribution to the liquid crystal panel 12. During the aforesaid process, since the phosphor layer structure 20 is away from the backlight source 18 by the specific distance D as shown in FIG. 2, the backlight module 14 could prevent the heat energy generated by the backlight source 18 from being directly transmitted to the phosphors in the phosphor layer structure 20. In such a manner, the backlight module 14 could efficiently prevent thermal degradation of the phosphors, so as to solve the prior art problem in which the gray tone and color coordinate of the white light are influenced by thermal degradation of the phosphors. Thus, the present invention could not only improve the image display quality of the display apparatus 10 and the light emitting efficiency of the phosphors, but also prolong life of the phosphors.

Figure 3:
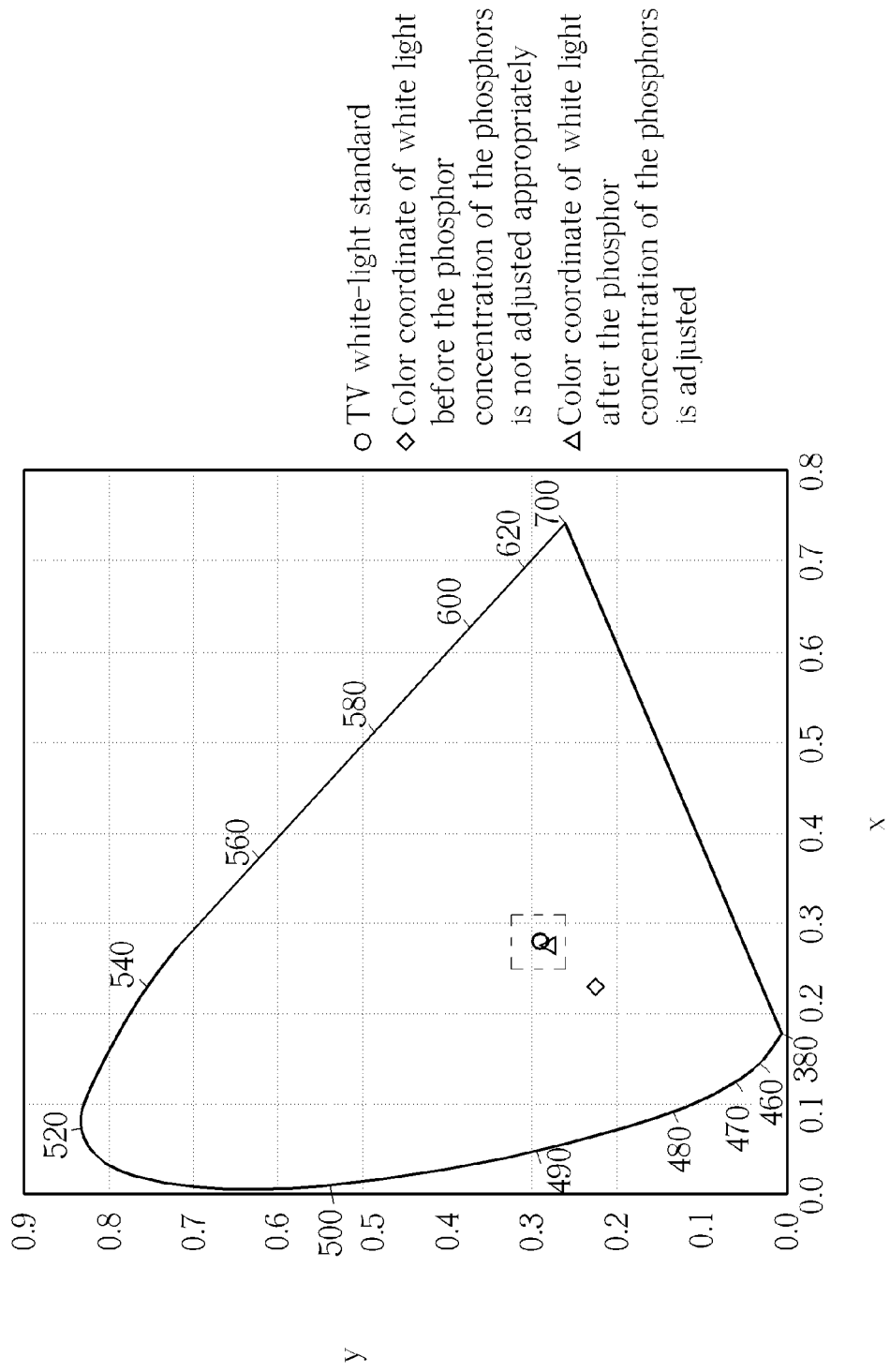
FIG. 3 is a color coordinate diagram of white light generated by a phosphor layer structure in FIG. 2.

It should be mentioned that the color coordinate of the white light generated by the phosphor layer structure 20 which is excited by the backlight source 18 corresponds to the phosphor concentration of the phosphors in the phosphor layer structure 20. Please refer to FIG. 3, which is a color coordinate diagram of the white light generated by the phosphor layer structure 20 in FIG. 2. According to the TV white-light standard, the color coordinate of the white light provided by the backlight module 14 needs to fall within a range of (0.28±0.03, 0.29±0.03) defined by a square depicted by dotted lines in FIG. 3. As shown in FIG. 3, if the phosphor concentration of the phosphors is not appropriately adjusted, the color coordinate of the white light (represented by a diamond mark in FIG. 3) usually falls out of the range of (0.28±0.03, 0.29±0.03). In this embodiment, the phosphor concentration of the phosphors in the phosphor layer structure 20 could be set to fall within a range between 3% and 4%, so as to make the color coordinate of the white light generated by the phosphor layer structure 20 (represented by a triangle mark in FIG. 3) fall within the range of (0.28±0.03, 0.29±0.03) and be close to a standard coordinate of (0.28, 0.29) which is represented by a circle mark in FIG. 3. Accordingly, the image display quality of the display apparatus 10 could be further improved.

Figure 4:
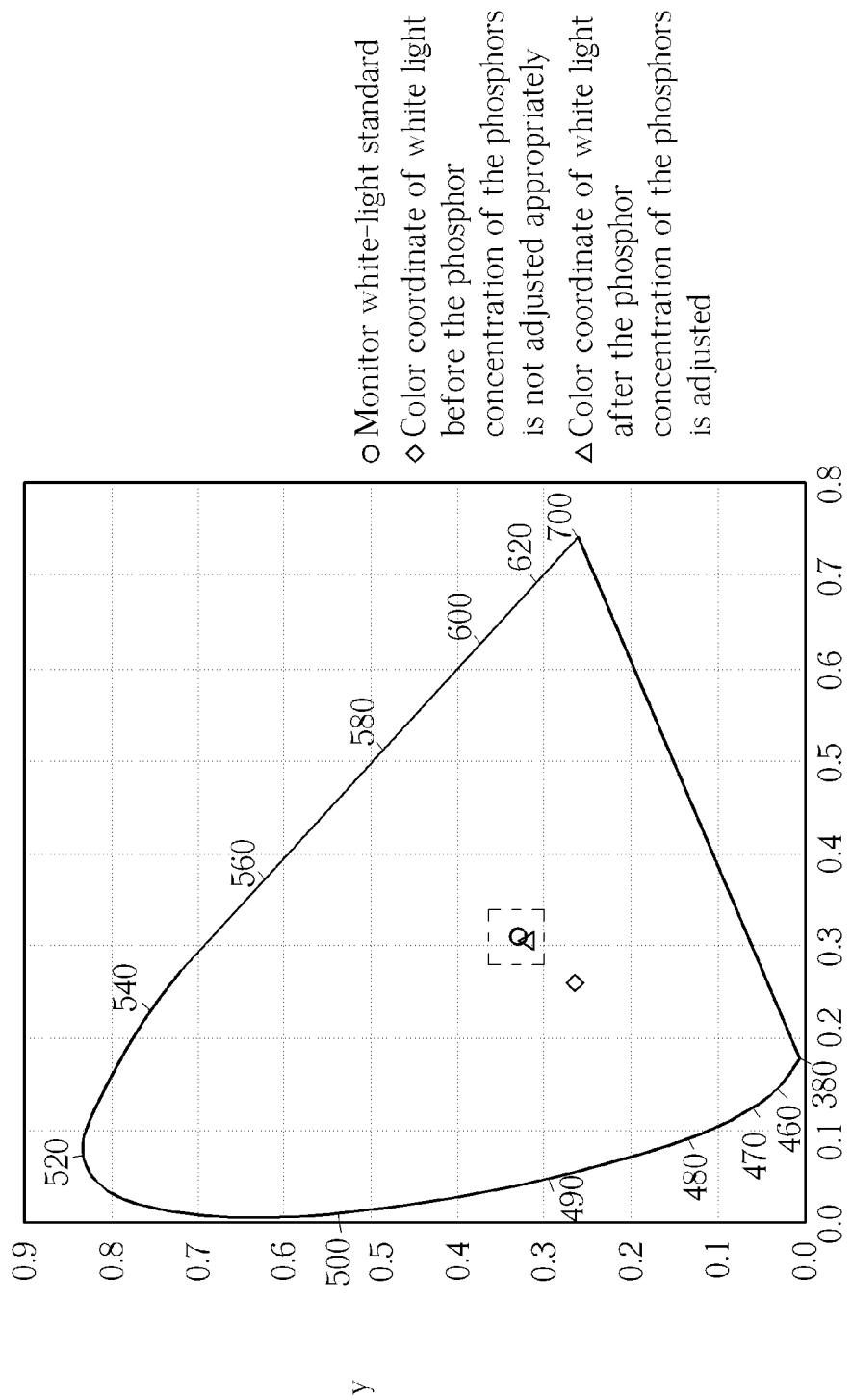
FIG. 4 is a color coordinate diagram of the white light generated by the phosphor layer structure in FIG. 2 according to another embodiment of the present invention.

On the other hand, please refer to FIG. 4, which is a color coordinate diagram of the white light generated by the phosphor layer structure 20 in FIG. 2 according to another embodiment of the present invention. According to the monitor white-light standard, the color coordinate of the white light provided by the backlight module 14 needs to fall within a range of (0.313±0.03, 0.329±0.03) defined by a square depicted by dotted lines in FIG. 4. As shown in FIG. 4, if the phosphor concentration of the phosphors is not appropriately adjusted, the color coordinate of the white light (represented by a diamond mark in FIG. 4) usually falls out of the range of (0.313±0.03, 0.329±0.03). In this embodiment, the phosphor concentration of the phosphors in the phosphor layer structure 20 could be set to fall within a range between 7% and 8%, so as to make the color coordinate of the white light generated by the phosphor layer structure 20 (represented by a triangle mark in FIG. 4) fall within the range of (0.313±0.03, 0.329±0.03) and be close to a standard coordinate of (0.313, 0.329) which is represented by a circle mark in FIG. 4. Accordingly, the image display quality of the display apparatus 10 could be further improved.

Disposal of the phosphor layer structure is not limited to the aforesaid embodiment. In other words, all designs of disposing the phosphor layer structure away from the backlight source for preventing heat energy of the backlight source from being directly transmitted to the phosphor layer structure may fall within the scope of the present invention.

Figure 5:
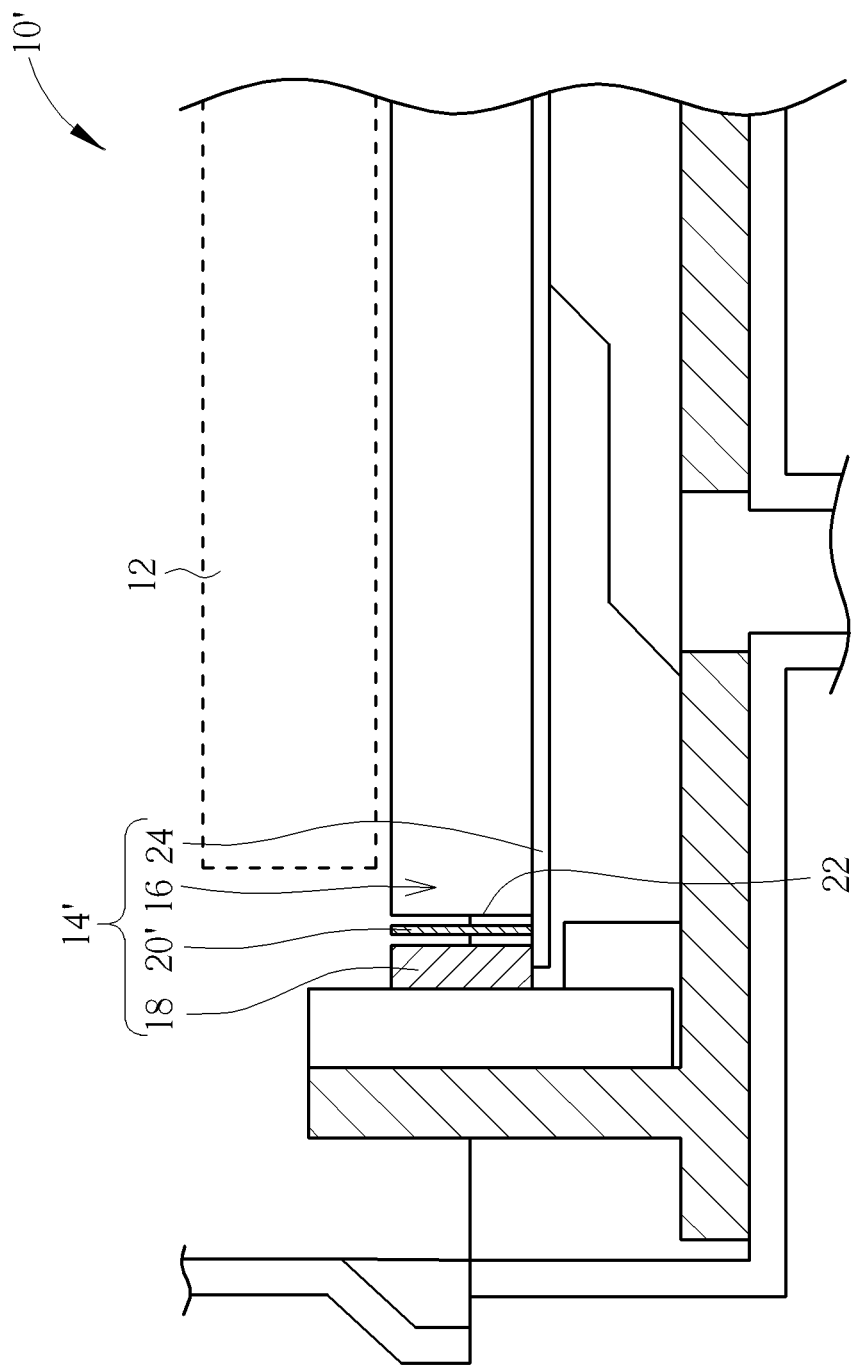
FIG. 5 is a partial sectional diagram of a display apparatus according to another embodiment of the present invention.

For example, please refer to FIG. 5, which is a partial sectional diagram of a display apparatus 10' according to another embodiment of the present invention. Components both mentioned in this embodiment and the aforesaid embodiment represent components with similar functions or structures, and the related description is omitted herein. The major difference between the display apparatus 10 and the display apparatus 10' is disposal of the phosphor layer structure. As shown in FIG. 5, the display apparatus 10' includes the liquid crystal panel 12 and a backlight module 14'. The backlight module 14' includes the light guide plate 16, the backlight source 18, a phosphor layer structure 20' and a frame 24. In this embodiment, the frame 24 is disposed at a position corresponding to the light guide plate 16. To be more specific, the frame 24 could be a back bezel disposed under the light guide plate 16, but not limited thereto, meaning that the frame 24 could also be other frame component for containing a light guide plate in a conventional backlight module (e.g. a plastic frame disposed above a light guide plate). In other words, all designs, in which a frame in a backlight module is utilized for disposal of a phosphor layer structure to make the phosphor layer structure located between a light entrance surface of a light guide plate and a backlight source and away from the backlight source, may fall within the scope of the present invention.

In the aforesaid design, the phosphor layer structure 20' could be a phosphor sheet disposed on the frame 24 and located between the light entrance surface 22 of the light guide plate 16 and the backlight source 18 (as shown in FIG. 5). The present invention could utilize a conventional fixing method to dispose the phosphor layer structure 20' on the frame 24, such as a glue connecting method, and the related description is omitted herein since it is commonly-seen in the prior art. Furthermore, the aforesaid phosphor concentration setting could be applied to the phosphor layer structure 20'. That is to say, the phosphor concentration in the phosphor sheet could be set to fall within a range between 3% and 4% so as to make the color coordinate of the white light generated by the phosphor sheet fall within the range of (0.28±0.03, 0.29±0.03), or set to fall within a range between 7% and 8% so as to make the color coordinate of the white light generated by the phosphor sheet fall within the range of (0.313±0.03, 0.329±0.03). Accordingly, the image display quality of the display apparatus 10' could be further improved.

Via the aforesaid design, the light emitted by the backlight source 18 could be incident into the phosphor layer structure 20' first. Accordingly, the phosphors doped in the phosphor layer structure 20' could be excited by the light so as to generate the white light. Subsequently, the white light could be incident into the light guide plate 16 via the light entrance surface 22, and then emitted from the light guide plate 16 via a light guiding structure in the light guide plate 16 (e.g. a mesh dot layer formed on a bottom surface of the light guide plate 16) so as to provide a surface light source with sufficient brightness and uniform distribution to the liquid crystal panel 12. During the aforesaid process, since the phosphor layer structure 20' is away from the backlight source 18 as shown in FIG. 5, the backlight module 14' could prevent the heat energy generated by the backlight source 18 from being directly transmitted to the phosphors in the phosphor layer structure 20'. In such a manner, the backlight module 14' could efficiently prevent thermal degradation of the phosphors, so as to solve the prior art problem in which the gray tone and color coordinate of the white light are influenced by thermal degradation of the phosphors. Thus, the present invention could not only improve the image display quality of the display apparatus 10' and the light emitting efficiency of the phosphors, but also prolong life of the phosphors.

Compared with the prior art directly packaging an LED and a silica gel doped with corresponding phosphors, the present invention utilizes the design in which the phosphor layer structure is disposed between the light entrance surface of the light guide plate and the backlight source and is away from the backlight source by a specific distance, to prevent heat energy generated by the backlight source from being directly transmitted to the phosphors in the phosphor layer structure. In such a manner, the present invention could efficiently prevent thermal degradation of the phosphors, so as to solve the prior art problem in which the gray tone and color coordinate of the white light are influenced by thermal degradation of the phosphors. Thus, the present invention could not only improve the image display quality of the display apparatus and the light emitting efficiency of the phosphors, but also prolong life of the phosphors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for providing white light to a liquid crystal panel, the backlight module comprising:
   a light guide plate having a light entrance surface;
   a backlight source disposed on a position corresponding to the light entrance surface of the light guide plate for emitting light; and
   a phosphor layer structure disposed between the backlight source and the light entrance surface of the light guide plate and being away from the backlight source by a specific distance, for receiving the light emitted by the backlight source to generate the white light.

2. The backlight module of claim 1, wherein the phosphor layer structure is a phosphor tape attached to the light entrance surface.

3. The backlight module of claim 2, wherein the phosphor concentration of the phosphor tape falls within a range between 3% and 4%, so as to make a color coordinate of the white light fall within a range of (0.28±0.03, 0.29±0.03).

4. The backlight module of claim 3, wherein the backlight source includes at least one blue LED (Light Emitting Diode), and yellow or dual-color phosphors are correspondingly doped in the phosphor tape.

5. The backlight module of claim 3, wherein the backlight source includes at least one ultraviolet LED, and red, green, and blue phosphors are correspondingly doped in the phosphor tape.

6. The backlight module of claim 2, wherein the phosphor concentration of the phosphor tape is between 7% and 8%, so as to make a color coordinate of the white light fall within a range of (0.313±0.03, 0.329±0.03).

7. The backlight module of claim 1 further comprising:
   a frame disposed at a position corresponding to the light guide plate for containing the light guide plate, the phosphor layer structure being a phosphor sheet disposed on the frame to be located between the light entrance surface of the light guide plate and the backlight source.

8. The backlight module of claim 7, wherein the phosphor concentration of the phosphor sheet is between 3% and 4%, so as to make a color coordinate of the white light fall within a range of (0.28±0.03, 0.29±0.03).

9. The backlight module of claim 8, wherein the backlight source includes at least one blue LED, and yellow or dual-color phosphors are correspondingly doped in the phosphor sheet.

10. The backlight module of claim 8, wherein the backlight source includes at least one ultraviolet LED, and red, green, and blue phosphors are correspondingly doped in the phosphor sheet.

11. The backlight module of claim 7, wherein the phosphor concentration of the phosphor sheet is between 7% and 8%, so as to make a color coordinate of the white light fall within a range of (0.313±0.03, 0.329±0.03).

12. A display apparatus comprising:
a liquid crystal panel; and
a backlight module disposed at a side of the liquid crystal panel for providing white light to the liquid crystal panel, the backlight module comprising:
a light guide plate having a light entrance surface;
a backlight source disposed on a position corresponding to the light entrance surface of the light guide plate for emitting light; and
a phosphor layer structure disposed between the backlight source and the light entrance surface of the light guide plate and being away from the backlight source by a specific distance, for receiving the light emitted by the backlight source to generate the white light.

13. The display apparatus of claim 12, wherein the phosphor layer structure is a phosphor tape attached to the light entrance surface.

14. The display apparatus of claim 13, wherein the phosphor concentration of the phosphor tape falls within a range between 3% and 4%, so as to make a color coordinate of the white light fall within a range of (0.28±0.03, 0.29±0.03).

15. The display apparatus of claim 13, wherein the phosphor concentration of the phosphor tape is between 7% and 8%, so as to make a color coordinate of the white light fall within a range of (0.313±0.03, 0.329±0.03).

16. The display apparatus of claim 12, wherein the backlight module further comprises a frame, the frame is disposed at a position corresponding to the light guide plate for containing the light guide plate, and the phosphor layer structure is a phosphor sheet disposed on the frame to be located between the light entrance surface of the light guide plate and the backlight source.

17. The display apparatus of claim 16, wherein the phosphor concentration of the phosphor sheet is between 3% and 4%, so as to make a color coordinate of the white light fall within a range of (0.28±0.03, 0.29±0.03).

18. The display apparatus of claim 16, wherein the phosphor concentration of the phosphor sheet is between 7% and 8%, so as to make a color coordinate of the white light fall within a range of (0.313±0.03, 0.329±0.03).

* * * * *